US010291121B1

(12) United States Patent
Hu et al.

(10) Patent No.: US 10,291,121 B1
(45) Date of Patent: May 14, 2019

(54) DC-TO-DC CONVERTER AND A DIGITAL CONSTANT ON-TIME CONTROLLER THEREOF

(71) Applicants: NCKU Research and Development Foundation, Tainan (TW); Himax Technologies Limited, Tainan (TW)

(72) Inventors: Kai-Yu Hu, Tainan (TW); Chien-Hung Tsai, Tainan (TW)

(73) Assignees: NCKU Research and Developmental Foundation, Tainan (TW); Himax Technologies Limited, Tainan (TW)

( * ) Notice: Subject to any disclaimer, the term of this patent is extended or adjusted under 35 U.S.C. 154(b) by 0 days.

(21) Appl. No.: 16/153,467

(22) Filed: Oct. 5, 2018

(51) Int. Cl.

| | |
|---|---|
| ***H02M 3/157*** | (2006.01) |
| ***H02M 1/08*** | (2006.01) |
| ***H02M 3/158*** | (2006.01) |
| *H02M 1/00* | (2006.01) |
| *G05F 1/575* | (2006.01) |
| *G05F 1/565* | (2006.01) |
| *H02M 3/156* | (2006.01) |

(52) U.S. Cl.
CPC ............. *H02M 3/157* (2013.01); *H02M 1/08* (2013.01); *H02M 3/158* (2013.01); *G05F 1/565* (2013.01); *G05F 1/575* (2013.01); *H02M 3/156* (2013.01); *H02M 2001/0009* (2013.01)

(58) Field of Classification Search
CPC ........ G05F 1/565; G05F 1/575; H02M 3/156; H02M 3/158; H02M 2001/0009
USPC ......................... 323/241, 274, 277, 283–286
See application file for complete search history.

(56) References Cited

U.S. PATENT DOCUMENTS

2014/0097817 A1* 4/2014 Liu .......................... G05F 1/46 323/283
2016/0172974 A1* 6/2016 Teh ....................... H02M 3/158 323/271
2016/0285366 A1* 9/2016 Lee ................... H05B 33/0815

OTHER PUBLICATIONS

Man Pun Chan et al., "A Monolithic Digital Ripple-Based Adaptive-Off-Time DC-DC Converter with a Digital Inductor Current Sensor," IEEE Journal of Solid-State Circuits, vol. 49, No. 8, Aug. 2014, pp. 1837-1847.

* cited by examiner

*Primary Examiner* — Gary A Nash
(74) *Attorney, Agent, or Firm* — Donald E. Stout; Stout, Uxa & Buyan, LLP

(57) ABSTRACT

A digital constant on-time controller adaptable to a direct-current (DC)-to-DC converter includes a current sensing circuit that senses stored energy of the DC-to-DC converter, thereby generating a sense voltage; an offset cancellation circuit coupled to receive the sense voltage, thereby generating an offset-removed sense voltage according to a valley voltage of the sense voltage; a comparator that compares the offset-removed sense voltage with a reference signal; and a pulse-width modulation (PWM) generator that generates a switch control signal according to a comparison result of the comparator.

17 Claims, 7 Drawing Sheets

DC-TO-DC CONVERTER AND A DIGITAL CONSTANT ON-TIME CONTROLLER THEREOF

BACKGROUND OF THE INVENTION

1. Field of the Invention

The present invention generally relates to a DC-to-DC converter, and more particularly to a DC-to-DC converter with output voltage offset cancellation.

2. Description of Related Art

A power converter is an electronic circuit that converts electric energy from one form to another. A DC-to-DC converter is a type of power converter that converts a direct-current (DC) source from one voltage level to another. In the DC-to-DC converter, an inductor disposed between a switch circuit and an output node is commonly used to store energy.

An analog current sensing circuit is ordinarily adopted in the DC-to-DC converter to sense the inductor current, which is utilized to control the switching of the switch circuit. For a constant on-time (COT) DC-to-DC converter, an analog ripple-based control is adopted by comparing the sensed inductor current with a reference voltage to generate a control signal for controlling the switch circuit. Unfortunately, this scheme disadvantageously introduces some output voltage offset error, which degenerates regulation performance of the DC-to-DC converter.

A need has thus arisen to propose a novel DC-to-DC converter with output voltage offset improvement.

SUMMARY OF THE INVENTION

In view of the foregoing, it is an object of the embodiment of the present invention to provide a DC-to-DC converter with output voltage offset cancellation, particularly a digital constant on-time controller adaptable to the DC-to-DC converter for effectively cancelling the output voltage offset.

According to one embodiment, a digital constant on-time controller adaptable to a direct-current (DC)-to-DC converter includes a current sensing circuit, an offset cancellation circuit, a comparator and a pulse-width modulation (PWM) generator. The current sensing circuit senses stored energy of the DC-to-DC converter, thereby generating a sense voltage. The offset cancellation circuit is coupled to receive the sense voltage, thereby generating an offset-removed sense voltage according to a valley voltage of the sense voltage. The comparator compares the offset-removed sense voltage with a reference signal. The PWM generator generates a switch control signal according to a comparison result of the comparator.

DETAILED DESCRIPTION OF THE INVENTION

Figure 1A:
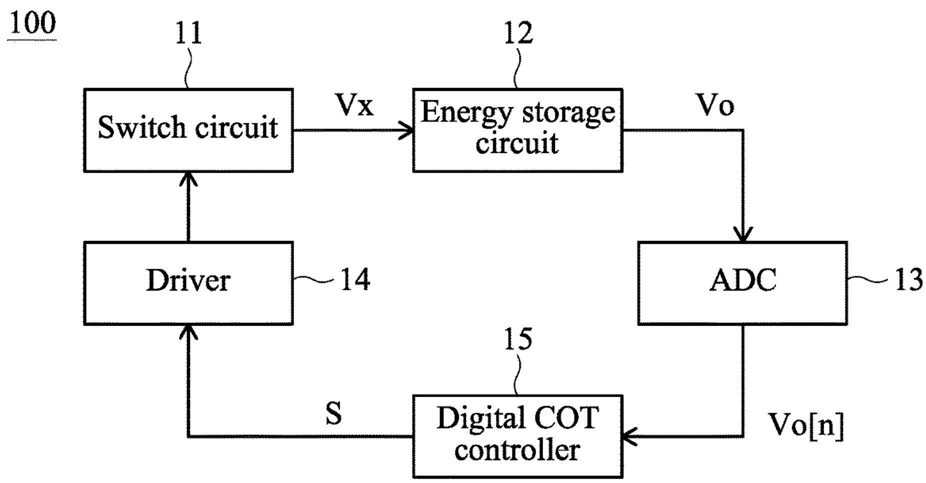
FIG. 1A shows a block diagram illustrating a DC-to-DC converter with output voltage offset cancellation according to a first embodiment of the present invention.
Figure 1B:
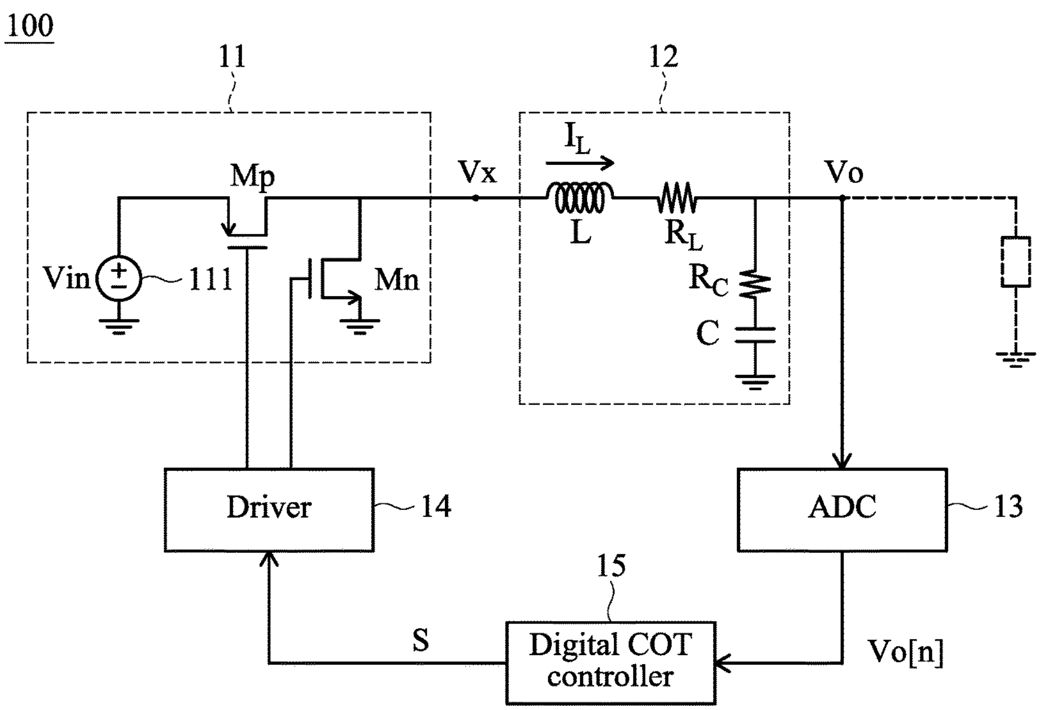
FIG. 1B shows a circuit diagram exemplifying some blocks of FIG. 1A.

FIG. 1A shows a block diagram illustrating a DC-to-DC converter 100 with output voltage offset cancellation according to a first embodiment of the present invention, and FIG. 1B shows a circuit diagram exemplifying some blocks of FIG. 1A.

In the embodiment, the DC-to-DC converter 100 may include a switch circuit 11 configured to generate a switch voltage Vx. Specifically, the switch circuit 11 may include a first switch device Mp (e.g., a P-type metal-oxide-semiconductor or PMOS transistor) and a second switch device Mn (e.g., an N-type MOS or NMOS transistor) series connected between a power supply 111 and ground. The power supply 111 is configured to supply an input voltage Vin. The switch voltage Vx is generated at a switch node Vx intermediate between the first switch device Mp and the second switch device Mn. Specifically, the first switch device Mp is electrically connected between the power supply 111 and the switch node Vx, and the second switch device Mn is electrically connected between the switch node Vx and the ground. In the specification, a symbol (e.g., Vx) may be used to designate either a node or a voltage at that node.

The DC-to-DC converter 100 of the embodiment may include an energy storage circuit 12 coupled to receive the switch voltage Vx, and configured to generate a regulated output voltage Vo providing to a load. Specifically, the energy storage circuit 12 may include an inductor L and an effective series resistor $R_L$ connected in series between the switch node Vx and an output node Vo, and an capacitor C and an effective series resistor $R_C$ connected in series between the output node Vo and ground.

The DC-to-DC converter 100 of the embodiment may include an analog-to-digital converter (ADC) 13 configured to generate a digital output voltage Vo[n] equivalent to the (analog) output voltage Vo. According to one aspect of the embodiment, the DC-to-DC converter 100 may include a driver 14 (e.g., an amplifier) configured to generate drive signals for driving the switch circuit 11. Specifically, the driver 14 may generate a drive signal for driving the first switch device Mp and an inverted drive signal for driving the second switch device Mn.

According to one aspect of the embodiment, the DC-to-DC converter 100 may include a digital constant on-time (COT) controller 15 coupled to receive the digital output voltage Vo[n], and configured to generate a switch control signal S being fed to the driver 14. In the embodiment, the digital COT controller 15 is configured to generate a constant on-time (COT) switch control signal S according to stored energy (e.g., an inductor current $I_L$ flowing through the inductor L) of the energy storage circuit 12.

Figure 2A:
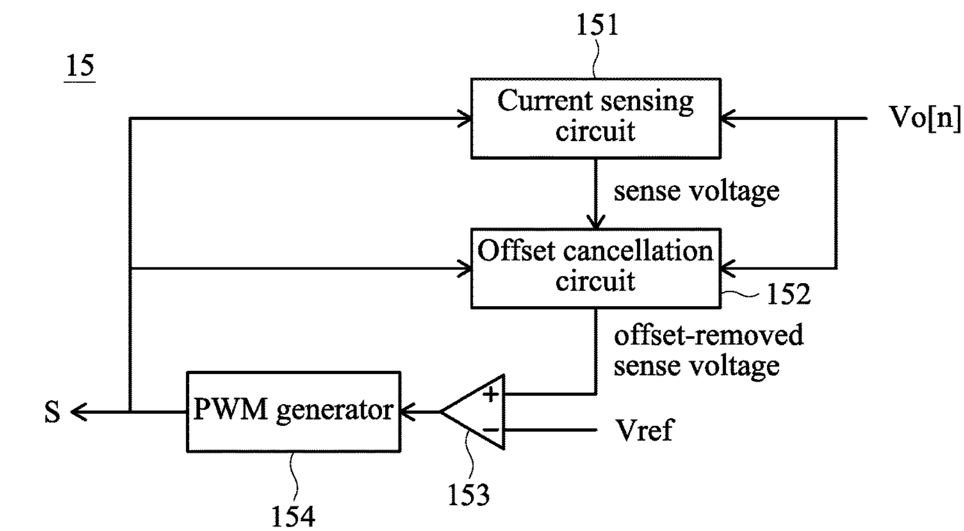
FIG. 2A shows a block diagram illustrating the digital COT controller of FIG. 1A according to the first embodiment of the present invention.
Figure 2B:
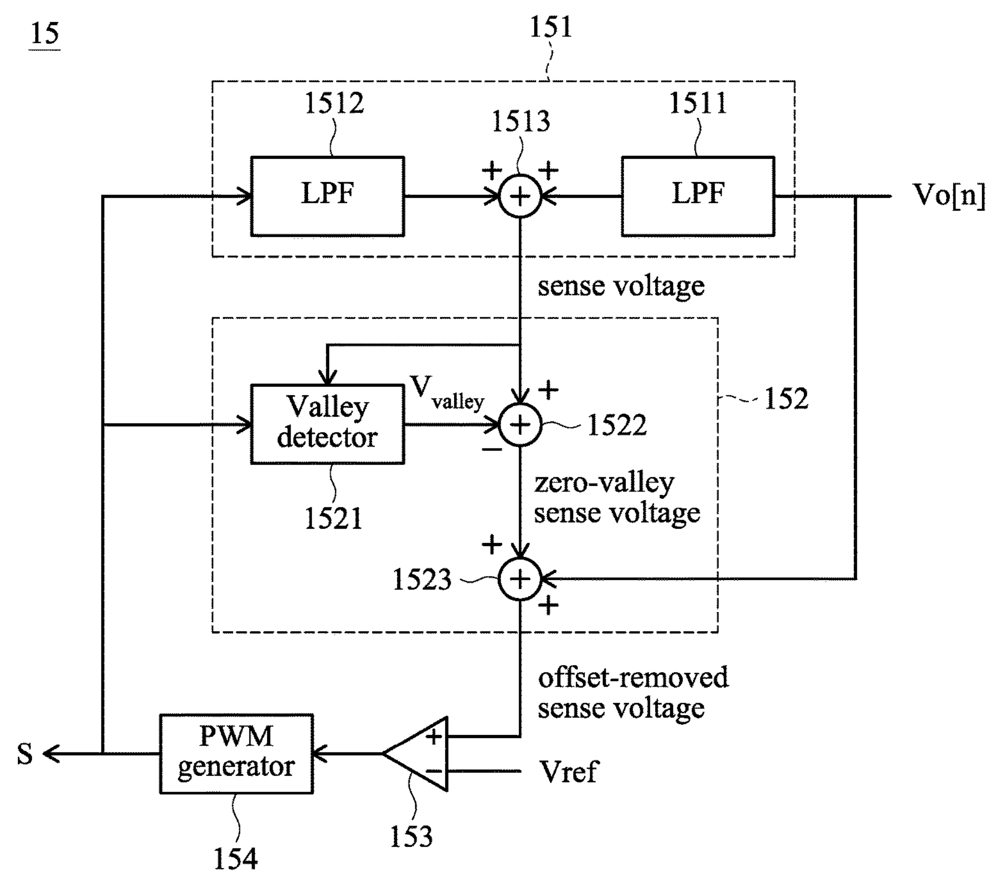
FIG. 2B shows a detailed block diagram exemplifying some blocks of FIG. 2A.

FIG. 2A shows a block diagram illustrating the digital COT controller 15 of FIG. 1A according to the first embodiment of the present invention, and FIG. 2B shows a detailed block diagram exemplifying some blocks of FIG. 2A.

Figure 2C:
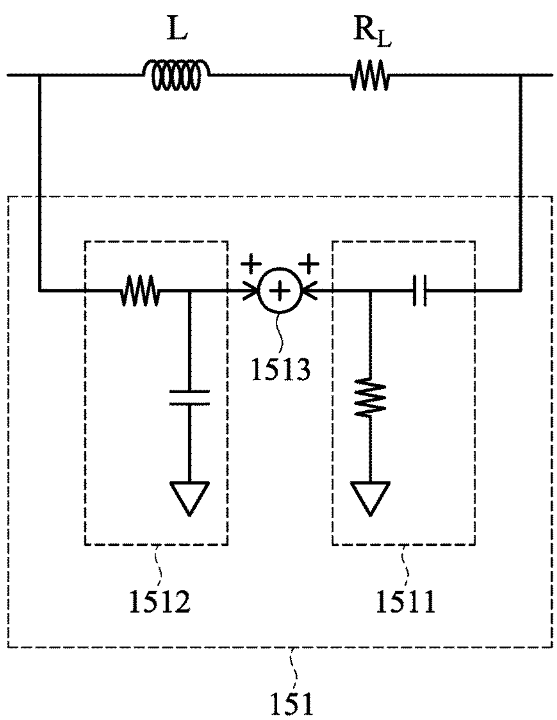
FIG. 2C shows an exemplary circuit demonstrating equivalent analog architecture of the current sensing circuit of FIG. 2B.

In the embodiment, the digital COT controller 15 may include a (digital) current sensing circuit 151 configured to sense stored energy (e.g., inductor current $I_L$) of the energy storage circuit 12, thereby generating a sense voltage representing a voltage across the effective series resistor $R_L$. Specifically, the current sensing circuit 151 may include a (digital) high-pass filter (HPF) 1511 and a (digital) low-pass filter (LPF) 1512 coupled to receive the digital output voltage Vo[n] and the switch control signal S, respectively. The current sensing circuit 151 may also include a first adder 1513 configured to add an output of the HPF 1511 and an output of the LPF 1512, thereby generating the sense voltage. FIG. 2C shows an exemplary circuit demonstrating equivalent analog architecture of the current sensing circuit 151 of FIG. 2B. Details of designing the HPF 1511 and the LPF 1512 may be referred to "A Monolithic Digital Ripple-Based Adaptive-Off-Time DC-DC Converter With a Digital Inductor Current Sensor," entitled to M. P. Chan et al., in IEEE Journal of Solid-State Circuits, vol. 49, no. 8, pp. 1837-1847, August 2014, the disclosure of which is incorporated herein by reference.

Figure 3A:
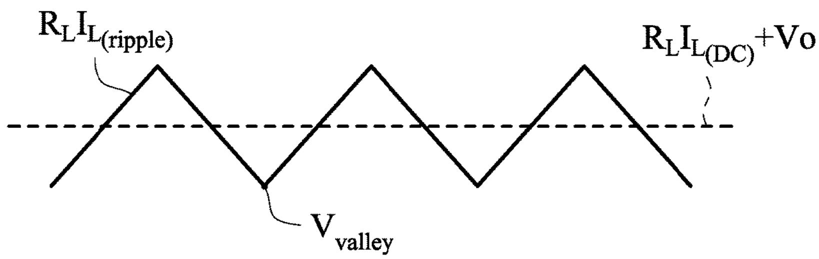
FIG. 3A shows an exemplary waveform of the sense voltage across the effective series resistor $R_L$, the valley voltage $V_{valley}$ of which is shown.

The digital COT controller 15 of the embodiment may include an offset cancellation circuit 152 coupled to receive the sense voltage (from the current sensing circuit 151) and the digital output voltage Vo[n], and configured to generate an offset-removed sense voltage according to the switch control signal S. Specifically, the offset cancellation circuit 152 may include a valley detector 1521 coupled to receive the switch control signal S and configured to detect a valley (or minimum) value of the sense voltage (from the current sensing circuit 151). FIG. 3A shows an exemplary waveform of the sense voltage across the effective series resistor $R_L$, the valley voltage $V_{valley}$ of which is shown. The sense voltage may include a ripple voltage $R_L I_{L(ripple)}$ centered at a DC voltage $R_L I_{L(DC)}$+Vo.

Figure 3B:
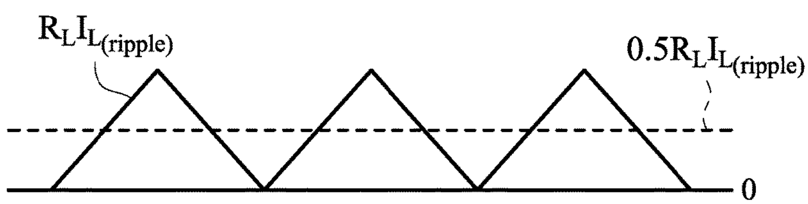
FIG. 3B shows an exemplary waveform of the zero-valley sense voltage, which is now centered at $0.5R_L I_{L(ripple)}$.

The offset cancellation circuit 152 of the embodiment may include a second adder 1522 configured to subtract the valley voltage $V_{valley}$ from the sense voltage (from the current sensing circuit 151), thereby generating a zero-valley sense voltage. FIG. 3B shows an exemplary waveform of the zero-valley sense voltage, which is now centered at $0.5R_L I_{L(ripple)}$.

Figure 3C:
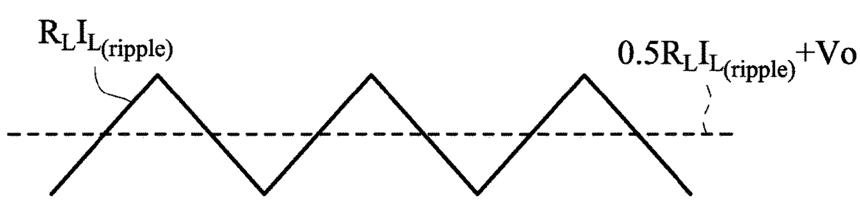
FIG. 3C shows an exemplary waveform of the offset-removed sense voltage, which is now centered at $0.5R_L I_{L(ripple)}+Vo$.

The offset cancellation circuit 152 of the embodiment may also include a third adder 1523 configured to add the zero-valley sense voltage and the digital output voltage Vo[n], thereby generating the offset-removed sense voltage. FIG. 3C shows an exemplary waveform of the offset-removed sense voltage, which is now centered at $0.5R_L I_{L(ripple)}$+Vo.

In the embodiment, the digital COT controller 15 may include a comparator 153 configured to compare the offset-removed sense voltage with a reference signal Vref. Specifically, a first input node (e.g., positive (+) input node) of the comparator 153 is coupled to receive the offset-removed sense voltage (from the offset cancellation circuit 152), and a second input node (e.g., negative (−) input node) of the comparator 153 is coupled to receive the reference signal Vref.

Figure 3D:
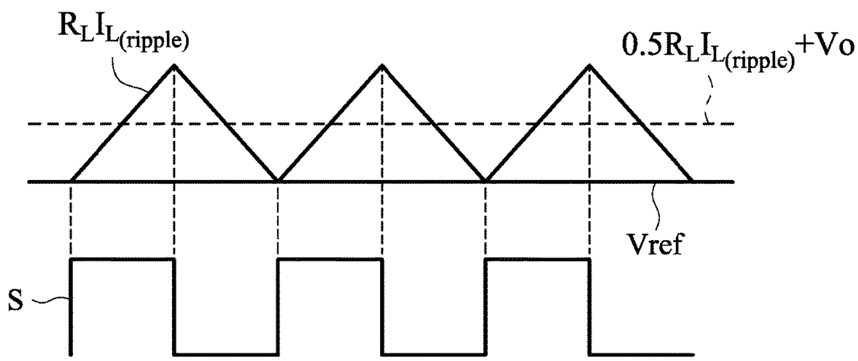
FIG. 3D shows pertinent signals of the comparator and the PWM generator of FIG. 2A according to the embodiment of the present invention.
Figure 3E:
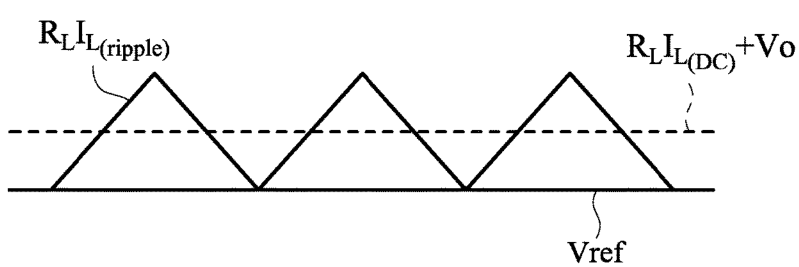
FIG. 3E shows pertinent signals of the comparator and the PWM generator without using the offset cancellation circuit of FIG. 2A.

The digital COT controller 15 of the embodiment may include a pulse-width modulation (PWM) generator 154 configured to generate the switch control signal S according to a comparison result of the comparator 153. FIG. 3D shows pertinent signals of the comparator 153 and the PWM generator 154 of FIG. 2A according to the embodiment of the present invention. The PWM generator 154 generates a pulse with a predetermined conduction time of the first switch device Mp whenever the offset-removed sense voltage is less than the reference signal Vref, thereby generating the constant on-time (COT) switch control signal S. Specifically, the first switch device Mp turns on (for a predetermined period) but the second switch device Mn turns off when the switch control signal S is asserted (e.g., S=1) triggered by the condition that the offset-removed sense voltage is less than the reference signal Vref. On the other hand, the first switch device Mp turns off but the second switch device Mn turns on when the switch control signal S is de-asserted (e.g., S=0). For the purpose of comparison, FIG. 3E shows pertinent signals of the comparator 153 and the PWM generator 154 without using the offset cancellation circuit 152 of FIG. 2A (that is, the sense voltage is directly coupled to the comparator 153). It is noted that the operation associated with FIG. 3E suffers output voltage offset error due to the term $R_L I_{L(DC)}$. To the contrary, according to the embodiment adopting the offset cancellation circuit 152, output voltage offset can be prevented by shifting the DC level of sense voltage to $0.5R_L I_{L(ripple)}$+Vo (as shown in FIG. 3A through FIG. 3C).

Figure 4A:
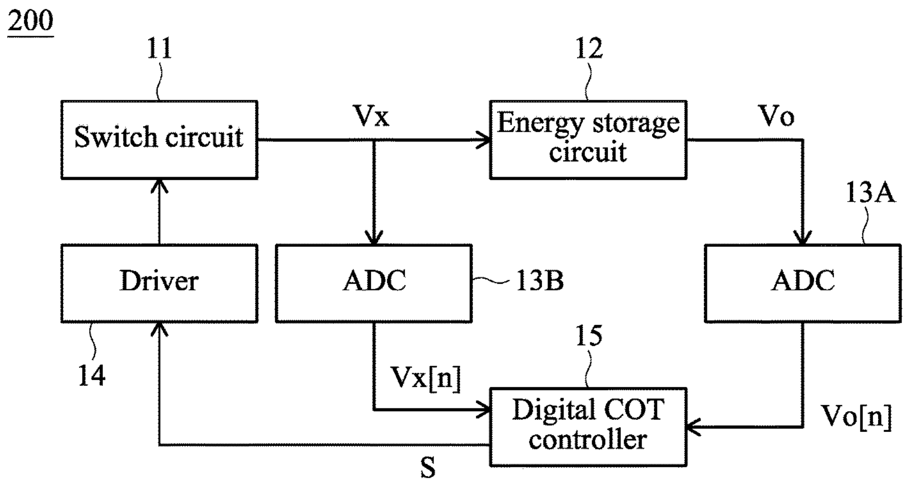
FIG. 4A shows a block diagram illustrating a DC-to-DC converter with output voltage offset cancellation according to a second embodiment of the present invention.
Figure 4B:
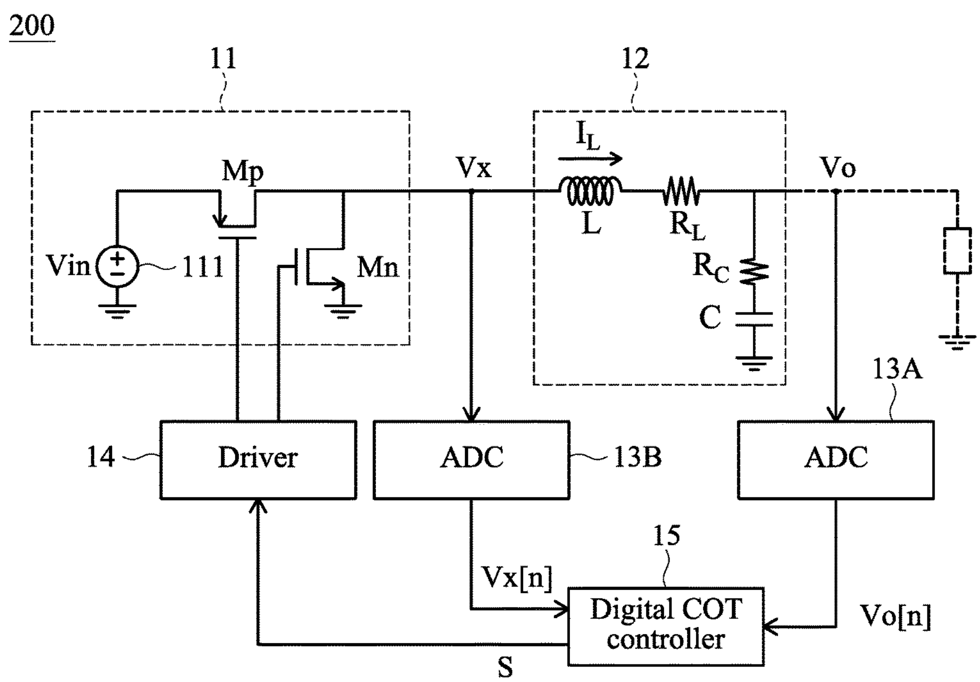
FIG. 4B shows a circuit diagram exemplifying some blocks of FIG. 4A.
Figure 5A:
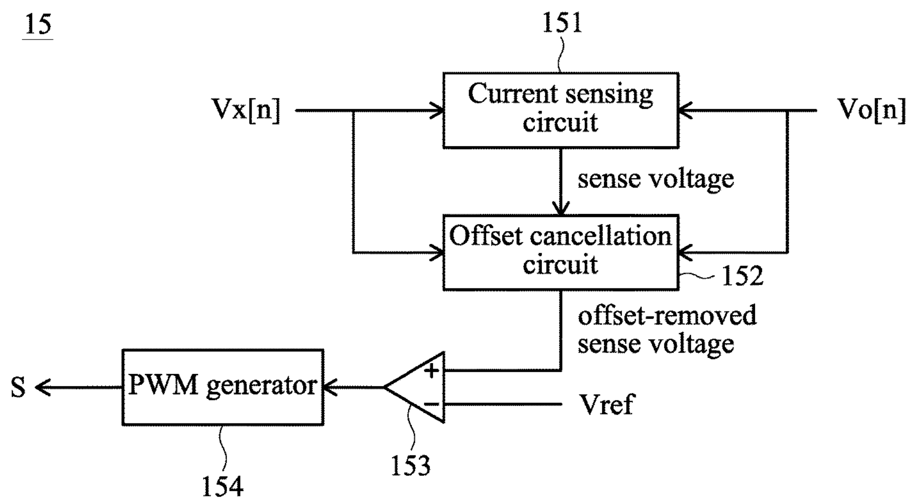
FIG. 5A shows a block diagram illustrating the digital COT controller of FIG. 4A according to the second embodiment of the present invention.
Figure 5B:
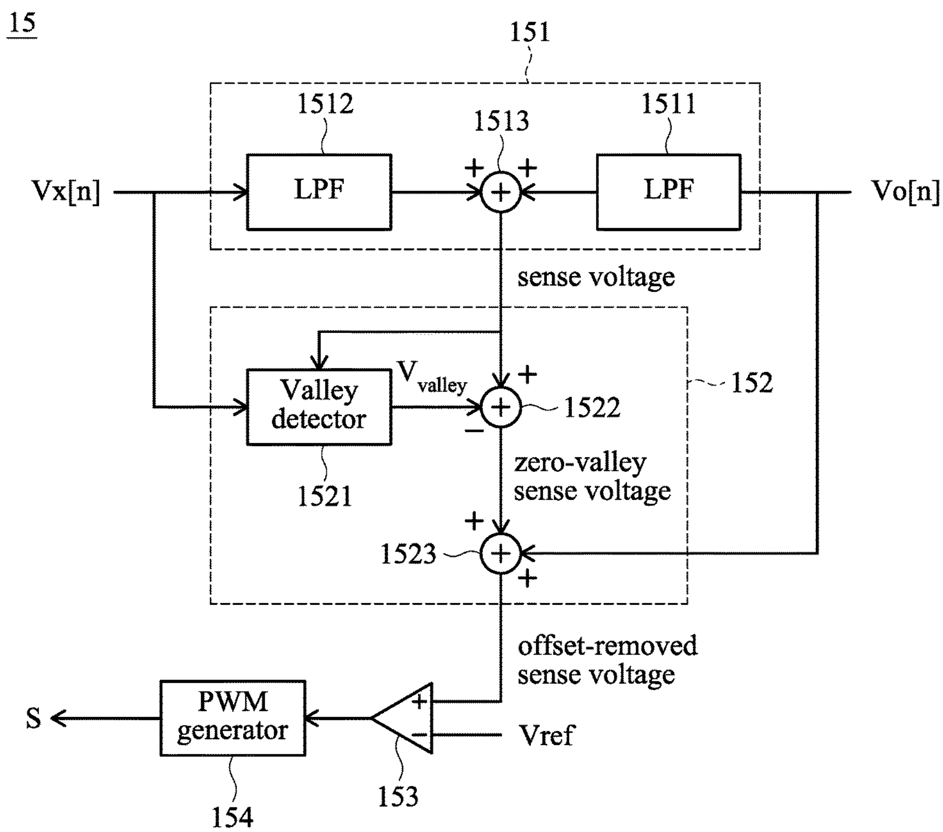
FIG. 5B shows a detailed block diagram exemplifying some blocks of FIG. 5A.

FIG. 4A shows a block diagram illustrating a DC-to-DC converter 200 with output voltage offset cancellation according to a second embodiment of the present invention, and FIG. 4B shows a circuit diagram exemplifying some blocks of FIG. 4A. FIG. 5A shows a block diagram illustrating the digital COT controller 15 of FIG. 4A according to the second embodiment of the present invention, and FIG. 5B shows a detailed block diagram exemplifying some blocks of FIG. 5A.

The second embodiment is similar to the first embodiment with the following exceptions. In the second embodiment, a first ADC 13A is configured to generate a digital output voltage Vo[n] equivalent to the (analog) output voltage Vo, and a second ADC 13B is configured to generate a digital switch voltage Vx[n] equivalent to the (analog) switch voltage Vx. Accordingly, the digital COT controller 15 of the second embodiment generates the switch control signal S according to both the digital output voltage Vo[n] and the digital switch voltage Vx[n], instead of only the digital output voltage Vo[n] as in the first embodiment. Specifically, the LPF 1512 of the current sensing circuit 151 and the valley detector 1521 of the offset cancellation circuit 152 of the second embodiment perform according to the digital switch voltage Vx[n], instead of the switch control signal S as in the first embodiment.

Although specific embodiments have been illustrated and described, it will be appreciated by those skilled in the art that various modifications may be made without departing from the scope of the present invention, which is intended to be limited solely by the appended claims.

What is claimed is:

1. A digital constant on-time (COT) controller adaptable to a direct-current (DC)-to-DC converter, comprising:

a current sensing circuit that senses stored energy of the DC-to-DC converter, thereby generating a sense voltage;

an offset cancellation circuit coupled to receive the sense voltage, thereby generating an offset-removed sense voltage according to a valley voltage of the sense voltage;

a comparator that compares the offset-removed sense voltage with a reference signal; and a pulse-width modulation (PWM) generator that generates a switch control signal according to a comparison result of the comparator.

2. The digital COT controller of claim 1, wherein the current sensing circuit comprises:

a high-pass filter (HPF) and a low-pass filter (LPF) coupled to receive a digital output voltage and the switch control signal, respectively; and a first adder that adds an output of the HPF and an output of the LPF, thereby generating the sense voltage.

3. The digital COT controller of claim 2, wherein the offset cancellation circuit comprises:

a valley detector that receives the switch control signal and accordingly detects the valley voltage;

a second adder that subtracts the valley voltage from the sense voltage, thereby generating a zero-valley sense voltage; and a third adder that adds the zero-valley sense voltage and the digital output voltage, thereby generating the offset-removed sense voltage.

4. The digital COT controller of claim 1, wherein the current sensing circuit comprises:

a high-pass filter (HPF) and a low-pass filter (LPF) coupled to receive a digital output voltage and a digital switch voltage, respectively; and a first adder that adds an output of the HPF and an output of the LPF, thereby generating the sense voltage.

5. The digital COT controller of claim 4, wherein the offset cancellation circuit comprises:

a valley detector that receives the digital switch voltage and accordingly detects the valley voltage;

a second adder that subtracts the valley voltage from the sense voltage, thereby generating a zero-valley sense voltage; and a third adder that adds the zero-valley sense voltage and the digital output voltage, thereby generating the offset-removed sense voltage.

6. A direct-current (DC)-to-DC converter, comprising:

a switch circuit that generates a switch voltage;

an energy storage circuit coupled to receive the switch voltage, thereby generating an output voltage;

a first analog-to-digital converter (ADC) that generates a digital output voltage equivalent to the output voltage;

a digital constant on-time (COT) controller coupled to receive the digital output voltage, and configured to generate a switch control signal; and a driver that generates at least one drive signal for driving the switch circuit according to the switch control signal;

wherein the digital COT controller comprises:

a current sensing circuit that senses stored energy of the energy storage circuit, thereby generating a sense voltage;

an offset cancellation circuit coupled to receive the sense voltage, thereby generating an offset-removed sense voltage according to a valley voltage of the sense voltage;

a comparator that compares the offset-removed sense voltage with a reference signal; and a pulse-width modulation (PWM) generator that generates the switch control signal according to a comparison result of the comparator.

7. The DC-to-DC converter of claim 6, wherein the current sensing circuit comprises:

a high-pass filter (HPF) and a low-pass filter (LPF) coupled to receive the digital output voltage and the switch control signal, respectively; and a first adder that adds an output of the HPF and an output of the LPF, thereby generating the sense voltage.

8. The DC-to-DC converter of claim 7, wherein the offset cancellation circuit comprises:

a valley detector that receives the switch control signal and accordingly detects the valley voltage;

a second adder that subtracts the valley voltage from the sense voltage, thereby generating a zero-valley sense voltage; and a third adder that adds the zero-valley sense voltage and the digital output voltage, thereby generating the offset-removed sense voltage.

9. The DC-to-DC converter of claim 6, further comprising a second ADC that generates a digital switch voltage equivalent to the switch voltage.

10. The DC-to-DC converter of claim 9, wherein the current sensing circuit comprises:

a high-pass filter (HPF) and a low-pass filter (LPF) coupled to receive the digital output voltage and the digital switch voltage, respectively; and a first adder that adds an output of the HPF and an output of the LPF, thereby generating the sense voltage.

11. The DC-to-DC converter of claim 10, wherein the offset cancellation circuit comprises:

a valley detector that receives the digital switch voltage and accordingly detects the valley voltage;

a second adder that subtracts the valley voltage from the sense voltage, thereby generating a zero-valley sense voltage; and a third adder that adds the zero-valley sense voltage and the digital output voltage, thereby generating the offset-removed sense voltage.

12. The DC-to-DC converter of claim 6, wherein the switch circuit comprises a first switch device and a second switch device series connected between a power supply and ground, the switch voltage being generated at a switch node intermediate between the first switch device and the second switch device.

13. The DC-to-DC converter of claim 12, wherein the first switch device comprises a P-type metal-oxide-semiconductor (PMOS) transistor and the second switch device comprises an N-type MOS (NMOS) transistor, wherein the first switch device is electrically connected between the power supply and the switch node, and the second switch device is electrically connected between the switch node and the ground.

14. The DC-to-DC converter of claim 12, wherein the energy storage circuit comprises an inductor and an effective series resistor connected in series between the switch node and an output node that provides the output voltage.

15. The DC-to-DC converter of claim 14, wherein the sense voltage comprises a ripple voltage $R_L I_{L(ripple)}$ centered at a DC voltage $R_L I_{L(DC)}+Vo$, wherein $R_L$ represents the effective series resistor, $I_L$ represents a current flowing through the inductor, and Vo represents the output voltage.

16. The DC-to-DC converter of claim 15, wherein the zero-valley sense voltage is centered at $0.5R_L I_{L(ripple)}$.

17. The DC-to-DC converter of claim 16, wherein the offset-removed sense voltage is centered at $0.5R_L I_{L(ripple)}$+Vo.

* * * * *